(12) United States Patent
Goi et al.

(10) Patent No.: US 9,548,639 B2
(45) Date of Patent: Jan. 17, 2017

(54) POWER GENERATION UNIT OF INTEGRATED GEARBOX DESIGN FOR AIRCRAFT ENGINE

(71) Applicant: KAWASAKI JUKOGYO KABUSHIKI KAISHA, Kobe-shi, Hyogo (JP)

(72) Inventors: Tatsuhiko Goi, Kobe (JP); Kenichiro Tanaka, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 57 days.

(21) Appl. No.: 14/550,083

(22) Filed: Nov. 21, 2014

(65) Prior Publication Data

US 2015/0311770 A1    Oct. 29, 2015

Related U.S. Application Data

(63) Continuation of application No. PCT/JP2013/064241, filed on May 22, 2013.

(30) Foreign Application Priority Data

May 30, 2012 (JP) ................. 2012-122579

(51) Int. Cl.
| | |
|---|---|
| *F02B 63/04* | (2006.01) |
| *H02K 7/10* | (2006.01) |
| *H02K 7/18* | (2006.01) |
| *F02C 7/32* | (2006.01) |
| *H02K 7/116* | (2006.01) |

(Continued)

(52) U.S. Cl.
CPC ............. *H02K 7/1807* (2013.01); *F02C 7/268* (2013.01); *F02C 7/32* (2013.01); *F02N 11/04* (2013.01); *H02K 7/108* (2013.01); *H02K 7/116* (2013.01); *H02K 7/1823* (2013.01); *F01D 15/10* (2013.01);

(Continued)

(58) Field of Classification Search
USPC ................... 290/1 C; 60/770–799
See application file for complete search history.

(56) References Cited

U.S. PATENT DOCUMENTS

| | | |
|---|---|---|
| 4,132,064 A | 1/1979 | Kumm |
| 4,476,395 A | 10/1984 | Cronin |

(Continued)

FOREIGN PATENT DOCUMENTS

| | | |
|---|---|---|
| CN | 101389841 A | 3/2009 |
| FR | 2 897 895 A1 | 8/2007 |

(Continued)

OTHER PUBLICATIONS

Communication dated Mar. 1, 2016 from the Canadian Intellectual Property Office in counterpart application No. 2874254.

(Continued)

*Primary Examiner* — Pedro J Cuevas
(74) *Attorney, Agent, or Firm* — Sughrue Mion, PLLC

(57) ABSTRACT

A power generation unit is connected with an engine rotary shaft via an accessory gearbox. A rotor extends through the accessory gearbox and a drive gear is disposed at an intermediate portion of the rotor for driving the latter. Permanent magnet elements are mounted on opposite side portions with the intermediate portion intervening therebetween, and stator coils are disposed so as to confront respective outer peripheries of the permanent magnet elements.

9 Claims, 4 Drawing Sheets

(51) Int. Cl.
F02C 7/268 (2006.01)
F02N 11/04 (2006.01)
H02K 7/108 (2006.01)
F01D 15/10 (2006.01)
F01D 15/12 (2006.01)

(52) U.S. Cl.
CPC ......... F01D 15/12 (2013.01); F05D 2220/768 (2013.01); F05D 2260/85 (2013.01)

(56) References Cited

U.S. PATENT DOCUMENTS

| | | | | |
|---|---|---|---|---|
| 5,349,814 | A * | 9/1994 | Ciokajlo | F02C 7/262 60/226.1 |
| 5,694,765 | A * | 12/1997 | Hield | F02C 3/113 60/39.163 |
| 5,845,483 | A * | 12/1998 | Petrowicz | F02C 7/262 60/39.163 |
| 5,880,571 | A * | 3/1999 | Seffernick | H02P 25/20 318/524 |
| 6,064,172 | A * | 5/2000 | Kuznetsov | G01R 31/346 318/434 |
| 6,242,881 | B1 * | 6/2001 | Giordano | F02N 11/04 244/17.11 |
| 6,467,725 | B1 * | 10/2002 | Coles | F01D 15/10 244/58 |
| 6,979,927 | B2 * | 12/2005 | Kometani | H02K 3/28 310/184 |
| 7,204,090 | B2 * | 4/2007 | O'Connor | F02C 7/275 60/39.08 |
| 7,285,871 | B2 * | 10/2007 | Derouineau | F02C 9/26 290/52 |
| 7,481,062 | B2 * | 1/2009 | Gaines | F02C 7/36 60/792 |
| 7,552,582 | B2 * | 6/2009 | Eick | F02C 3/107 60/39.163 |
| 7,648,278 | B2 * | 1/2010 | Stout | F16C 27/04 384/535 |
| 7,728,447 | B2 | 6/2010 | Becquerelle et al. | |
| 7,841,163 | B2 * | 11/2010 | Welch | F02C 7/262 60/226.1 |
| 7,888,839 | B2 * | 2/2011 | Gabrys | H02K 3/47 310/112 |
| 7,997,085 | B2 * | 8/2011 | Moniz | F01D 15/10 60/778 |
| 8,006,501 | B2 | 8/2011 | Dusserre-Telmon et al. | |
| 8,013,488 | B2 | 9/2011 | Berenger et al. | |
| 8,146,370 | B2 * | 4/2012 | Zeiner | F02C 3/10 60/778 |
| 8,333,554 | B2 * | 12/2012 | Chaudhry | F02C 7/32 415/122.1 |
| 8,424,416 | B2 * | 4/2013 | Short | F01D 15/10 74/423 |
| 8,427,117 | B2 * | 4/2013 | Trainer | H02P 9/102 219/660 |
| 8,500,583 | B2 | 8/2013 | Goi et al. | |
| 8,955,335 | B2 * | 2/2015 | Burns | B64D 35/00 60/787 |
| 8,955,403 | B2 * | 2/2015 | Beier | F02C 7/32 74/15.63 |
| 9,062,611 | B2 * | 6/2015 | Sheridan | F02C 7/32 |
| 9,200,592 | B2 * | 12/2015 | Berryann | F01D 19/00 |
| 9,273,610 | B2 * | 3/2016 | Fingleton | H02J 7/00 |
| 9,435,419 | B2 * | 9/2016 | Hoebel | F16H 49/001 |
| 2004/0012292 | A1 * | 1/2004 | Kometani | H02K 3/28 310/184 |
| 2005/0188704 | A1 * | 9/2005 | Butt | F01D 25/20 60/778 |
| 2005/0279102 | A1 * | 12/2005 | O'Connor | F02C 7/275 60/778 |
| 2006/0010875 | A1 * | 1/2006 | Mahoney | F02C 3/13 60/772 |
| 2006/0042252 | A1 * | 3/2006 | Derouineau | F02C 9/26 60/703 |
| 2006/0260323 | A1 * | 11/2006 | Moulebhar | F01D 21/003 60/793 |
| 2006/0272313 | A1 * | 12/2006 | Eick | F02C 3/107 60/39.63 |
| 2007/0277532 | A1 | 12/2007 | Talan | |
| 2008/0006023 | A1 | 1/2008 | Lardellier | |
| 2008/0053257 | A1 | 3/2008 | Dusserre-Telmon et al. | |
| 2008/0166076 | A1 * | 7/2008 | Stout | F16C 27/04 384/99 |
| 2008/0231131 | A1 * | 9/2008 | Gabrys | H02K 3/47 310/114 |
| 2008/0238098 | A1 | 10/2008 | Becquerelle et al. | |
| 2008/0250792 | A1 * | 10/2008 | Wang | F02C 7/14 60/806 |
| 2009/0232640 | A1 | 9/2009 | Deperrois et al. | |
| 2009/0309461 | A1 | 12/2009 | Berenger et al. | |
| 2011/0101693 | A1 | 5/2011 | Goi et al. | |
| 2011/0154827 | A1 | 6/2011 | Ress, Jr. et al. | |
| 2012/0280091 | A1 * | 11/2012 | Saiz | B64C 27/26 244/7 R |
| 2013/0056982 | A1 | 3/2013 | Gozdawa | |
| 2013/0076120 | A1 * | 3/2013 | Wagner | B64D 33/00 307/9.1 |
| 2013/0247539 | A1 * | 9/2013 | Hoppe | F02C 7/32 60/39.15 |
| 2014/0232117 | A1 * | 8/2014 | Spooner | F03B 13/264 290/54 |
| 2014/0366546 | A1 * | 12/2014 | Bruno | F02C 9/00 60/772 |
| 2016/0109133 | A1 * | 4/2016 | Edwards | H02P 1/00 60/786 |

FOREIGN PATENT DOCUMENTS

| | | |
|---|---|---|
| GB | 2476261 A | 6/2011 |
| JP | 63-501840 A | 7/1988 |
| JP | 2001-271656 A | 10/2001 |
| JP | 2008-57541 A | 3/2008 |
| JP | 2008-190526 A | 8/2008 |
| JP | 2009-222059 A | 10/2009 |
| JP | 2011-117437 A | 6/2011 |
| WO | 87/02199 A1 | 4/1987 |
| WO | 2011/073664 A2 | 6/2011 |

OTHER PUBLICATIONS

Communication dated Jan. 15, 2016 from the European Patent Office in counterpart application No. 13797413.5.
International Preliminary Report on Patentability, dated Dec. 11, 2014, issued by the International Searching Authority in counterpart Application No. PCT/JP2013/064241.
International Search Report for PCT/JP2013/064241 dated Jun. 18, 2013 [PCT/ISA/210].
JPO Office Action for Application No. 2012-122579 dated Jun. 18, 2013.
JPO Office Action for Application No. 2012-122579 dated Dec. 17, 2013.
JPO Office Action for Application No. 2012-122579 dated Jun. 17, 2014.
Communication dated May 4, 2016 from the State Intellectual Property Office of the P.R.C. in counterpart Application No. 201380026027.1.

* cited by examiner

POWER GENERATION UNIT OF INTEGRATED GEARBOX DESIGN FOR AIRCRAFT ENGINE

CROSS REFERENCE TO THE RELATED APPLICATION

This application is a continuation application, under 35 U.S.C. §111(a), of international application No. PCT/JP2013/064241, filed May 22, 2013, which claims priority to Japanese patent application No. 2012-122579, filed May 30, 2012, the disclosure of which are incorporated by reference in their entirety into this application.

BACKGROUND OF THE INVENTION

Field of the Invention

The present invention relates to an electric power generator of an integrated gear box design, which is fitted to an aircraft engine and driven by an engine rotary shaft.

Description of Related Art

The aircraft engine has various aircraft accessory equipments such as, for example, an power generating unit, a starter, a hydraulic pump, a lubrication pump and a fuel pump, which are fitted to an engine main body through an accessory gear box (AGB) so that they can be driven by an engine rotary shaft through the accessory gearbox. For the power generating unit, a power generator of a coil exciting type (electromagnet type) having an excellent power generation efficiency is generally utilized. In this respect, see the patent document 1 listed below.

PRIOR ART DOCUMENT

Patent Document

Patent Document 1: U.S. Pat. No. 7,728,447

DISCLOSURE OF THE INVENTION

The aircraft engine is required to have a frontal projected area of the contour reduced as small as possible to thereby reduce the air resistance in order to increase the mileage and also to have a compact profile in order to increase the stealth performance. With respect to the power generation unit, which is the biggest auxiliary equipment of all used in an aircraft, a power generating capacity of about 90 kVA was required for the aircraft having a 200 seating capacity used in 1980s, but for the aircraft in these recent years, say, 2010s, a power generating capacity of 250 kVA or higher has been required the aircrafts have been remarkably more electric. If such a large power generating capacity of 250 kVA or higher is desired to be taken out from the coil exciting type electric power generator, which is employed in the existing power generation unit, the coil turns of the rotor and the stator need to be increased to a value required to secure the desired large power generating capacity. The increase in coil turns leads to the use of the rotor and the stator each having an increased outer diameter, resulting in increasing the size of the power generation unit. Also, the accessory gearbox used to support the large power generation unit discussed above with respect to the engine is necessarily increased in size. Thus, the increase in size of the power generation unit and the accessory gearbox appears to be disincentive to the improvements in mileage and stealth performance that are planned through the reduction of the frontal projected area of the aircraft engine.

In view of the foregoing, the present invention has for an object to provide a power generation unit of an integrated gearbox for use in an aircraft engine, which does not require the increase in frontal projected area of the aircraft engine, when it is mounted on the aircraft engine, while the required large power generating capacity is secured.

In order to accomplish the foregoing object, a power generation unit for an aircraft engine in accordance with the present invention is connected with an engine rotary shaft of the aircraft engine via an accessory gearbox, and includes: a rotor extending through the accessory gearbox; a drive gear mounted on an intermediate portion of the rotor to drive the rotor; permanent magnet elements respectively mounted on opposite side portions of the rotor with the intermediate portion intervening therebetween; and stator coils disposed so as to respectively confront outer peripheries of the permanent magnet elements, the stator coils being electrically connected with each other.

Considering that, when the power generating capacity is desired to be increased, the coil turns of each of the rotor and stator both employed in the coil exciting type electric power generator employed in the existing power generation unit is required to be increased, the outer diameter tends to increase. In contrast thereto, in the power generation unit of the present invention, since the structure of the permanent magnet type power generation unit utilizing the rotor, on which the permanent magnet elements are mounted, and the stator coils, disposed so as to confront the outer peripheries of the permanent magnet elements, is employed, the increase of the axial length of each permanent magnet element and the corresponding stator coil is effective to increase the power generating capacity. Moreover, since the stator coils, provided on the respective side portions relative to the intermediate portion of the rotor, are electrically connected with each other, the sum of the respective electric powers generated by those stator coils becomes the output electric power. Accordingly, where the required large power generating capacity is to be secured, the rotor and the corresponding stator coil can have a length corresponding to the increase of the power generating capacity and can be rendered to have the outer diameter represented by the thin elongated shape. As a result, the power generation unit of the present invention can be fitted to the aircraft engine while occupying a space that will not result in the increased frontal projected area and, therefore, not only can the increase of the mileage be realized while suppressing the increase of the air resistance of the aircraft engine, but the stealth performance can be also increased.

In the meantime, when in securing the large power generating capacity as discussed above, the power generation unit, which has an elongated contour, is mounted to the accessory gearbox (AGB) in a manner similar to that hitherto practiced, not only do the overhang moment from the accessory gearbox of the power generation unit increase, but also the vibrations tend to increase. Accordingly, in the power generation unit of the present invention, the structure is employed in which the rotor of the elongated contour extends through the accessory gearbox and is so designed as to be driven by the drive gear disposed at the intermediate portion of the rotor. Accordingly, since the rotor comes to be held in position protruding outwardly from opposite end faces of the accessory gearbox, even though the power generation unit come to represent the elongated shape as a result of the securement of the large power generating capacity, the power generation unit can be stably supported to the aircraft engine while the possible increase of the overhang moment is effectively suppressed.

In one embodiment of the present invention, the rotor may be disposed parallel to the engine rotary shaft. According to this disposition, the rotor, which represents a thin and elongated shape for the purpose of securing the large power generating capacity, comes to be disposed parallel to the engine rotary shaft, that is, in an arrangement extending along an anteroposterior direction of the aircraft engine, and, therefore, an undesirable increase of the frontal projected area can be suppressed.

In one embodiment of the present invention, the stator coils may be electrically connected in series with each other. The series connection of the stator coils is effective to allow a voltage equal to the sum of respective output voltages of the stator coils to be outputted and, therefore, while the outer diameter of each of the stator coils is reduced, the required large power generating capacity can be secured.

In one embodiment of the present invention, the power generation unit may include a mechanical clutch to selectively couple and decouple between the drive gear and an input shaft of the accessory gearbox, in which the input shaft of the accessory gearbox being connected with the engine rotary shaft through an output shaft. In this case, the input shaft of the accessory gearbox is connected with the engine rotary shaft through the output shaft. The use of the mechanical clutch is particularly advantageous in that even though in the event of occurrence of an abnormality such as, for example, shortcircuiting of an output line the output electric power cannot be immediately shut off by means of the interruption of the supply of an electric exciting current such as observed with the existing coil exciting type power generation unit, the mechanical clutch when operated can immediately interrupt the power transmission from the engine rotary shaft to the rotor of the power generation unit to thereby halt the drive of the power generation unit. At this time, the input shaft of the accessory gearbox is held in a condition connected with the engine rotary shaft through the output shaft and, therefore, the power is kept continuously transmitted to the auxiliary equipments other than the power generation unit then connected with the input shaft, allowing the other auxiliary equipments to be functioning regardless of the operating condition of the power generation unit. Also, as regards the electric leakage and the shortcircuiting of the output line, the frequency of occurrence thereof is extremely low and, when it is resolved, the power generation unit can be easily re-driven by switching the mechanical clutch to the coupled condition even during the flight of the aircraft.

In one embodiment of the present invention, a squeeze film damper to support a bearing of the rotor with respect to a power generator housing may be provided. According to the use of the squeeze film damper, if the rotor comes to have an elongated shape so that a large power generating capacity may be secured with a small diameter of the rotor, it may occur that the natural frequency of the rotor may decrease down to a value lower than the rotational speed. In such case, considerably vibrations of the rotor will occur as a result of resonance during the operation, but the support of the bearing for the rotor through the squeeze film damper is effective to reduce the vibration transmitted to the power generator housing.

In one embodiment of the present invention, the rotor may be in the form of a single rod-like member. When the single rod-like member is employed for the rotor, the rotor has a single piece body of a simple structure, in which the permanent magnet element is mounted on opposite side portions then sandwiching the intermediate portion thereof where the drive gear is arranged.

In one embodiment of the present invention, the rotor may be configured to be divided into the intermediate portion and the opposite side portions. Assuming that the rotor is of the structure divided into the intermediate portion and opposite side portions, assemblage of the rotor to the accessory gearbox can be easily accomplished by fitting the intermediate portion of the rotor to the accessory gearbox so as to be driven by the drive gear, followed by fitting of the opposite side portions of the rotor to the intermediate portion thereof.

In one embodiment of the present invention, the power generation unit for the aircraft engine may be connected with a high pressure shaft that forms a part of the engine rotary shaft, and operates also as an engine starter. According to this structural feature, the power generation unit can rotatively drive a compressor and a high pressure turbine, which are connected with each other through the high pressure shaft, to thereby start the aircraft engine and, therefore, no extra starter need be employed.

An accessory gearbox in accordance with the present invention includes: an input shaft connected through an output shaft with an engine rotary shaft of the aircraft engine; the power generation unit in accordance with the present invention; and a mechanical clutch to selectively couple and decouple between the input shaft and the drive gear.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described in detail with particular reference to the accompanying drawings.

Figure 1:
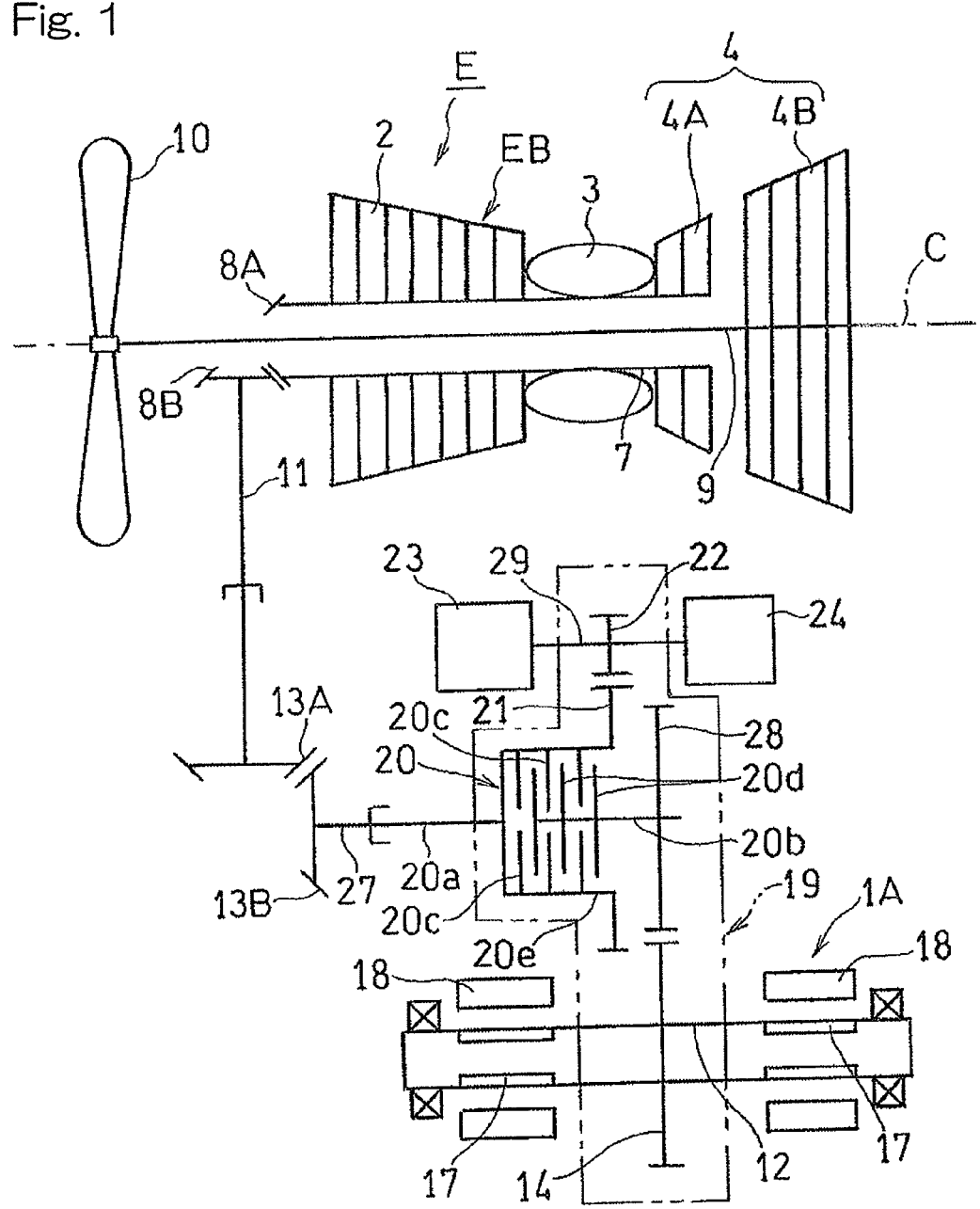
FIG. 1 is a schematic diagram showing the manner of connection of the power generation unit with an aircraft engine in accordance with the first embodiment of the present invention.

FIG. 1 schematically shows the manner of connection of the power generation unit 1A, designed according to the first embodiment, with an engine main body EB of the aircraft engine E. As shown therein, the engine E is a turbofan engine of biaxial type and includes, as components, a compressor 2, a combustor 3, a turbine 4 and a fan 10. Fuel is mixed with a compressed air, which is supplied from the compressor 2 and is then burned by the combustor 3 to produce a high temperature and high pressure combustion gas as a result of the combustion of the air-fuel mixture, which gas is subsequently supplied to the turbine 4. The turbine 4 includes a high pressure turbine 4A on a front stage side and a low pressure turbine 4B on a rear stage side. The compressor 2 is drivingly connected with the high pressure turbine 4A through a hollow high pressure shaft 7 and is accordingly rotatively driven by the high pressure turbine 4A. The fan 10 is drivingly connected with the low pressure turbine 4B through a low pressure shaft 9, which is inserted through the hollow of the high pressure shaft 7 and is therefore rotatively driven by the low pressure turbine 4B. The high pressure shaft 7 and the low pressure shaft 9, both of which are engine rotary shafts, are arranged in a coaxial relation with each other and also commonly with the longitudinal axis C of the engine E. In this way, a jet stream of the combustion gas, jetted from the low pressure turbine 4B, and a high speed air stream generated by the fan 10 cooperate with each other to provide an engine thrust force.

The high pressure shaft 7 has a front end provided with a bevel gear 8A positioned rearwardly of the fan 10, and a bevel gear 8B meshed with the bevel gear 8A is provided in one end portion of an output shaft 11 that extends radially of the high pressure shaft 7. This output shaft 11 has the opposite end portion provided with a bevel gear 13A, and a bevel gear 13B meshed with the bevel gear 13A is provided on one end portion of an input shaft 27 of the accessory gearbox (AGB) 19. Accordingly, the high pressure shaft 7 forming a part of the engine rotary shaft, and the input shaft 27 of the accessory gearbox 19 are connected with each other through the output shaft 11.

On the other hand, the power generation unit 1A, which is one of auxiliary equipments of the engine E, is provided with a rotor 12 which is a single rod-like member and is inserted through the accessory gearbox 19. The rotor 12 has a generally intermediate portion, which is intermediate with respect to the length of the rotor 12, provided with a drive gear (spur gear) 14 for driving the rotor 12. The rotor 12 also has opposite side portions, between which the intermediate portion of the rotor 12 intervenes, mounted with respective permanent magnet elements 17. Stator coils 18 are disposed so as to confront respective outer peripheries of the permanent magnet elements 17 on the opposite side portions. In other words, the power generation unit 1A referred above is of a type integrated with the accessory gear box 19 and is hence referred to as a power generation unit of the integrated gearbox type. This power generation unit 1A is also referred to as a permanent magnet type power generator as it makes use of the permanent magnet elements 17, mounted on the rotor 12, and the stator coils 18 arranged so as to confront the outer peripheries of the adjacent permanent magnet elements 17. As shown, the rotor 12 is fitted to the engine E in a fashion parallel to the high pressure shaft 7, which forms the engine rotary shaft, that is, parallel to the engine longitudinal axis C. The details thereof will be described later.

Within the accessory gearbox 19 referred to above, a mechanical clutch 20 capable of selectively coupling and decoupling is provided. Although in the instance as shown in FIG. 1 a wet multi-plate clutch 20 is employed for the mechanical clutch 20, the mechanical clutch 20 may be employed in the form of any known clutch other than the wet multi-plate clutch, such as, for example, a dry multi-plate clutch, a cone friction clutch, or dog clutch.

The wet multi-plate clutch 20 has an input side rotary shaft 20a for rotatively driving a clutch housing 20e, which is provided with a plurality of friction plates 20c, and an output side rotary shaft 20b having a plurality of clutch plates 20d which are axially displaceably arranged between the neighboring friction plates 20c and 20c. This mechanical clutch 20 is so designed and so configured that each of the friction plates 20c is urged against the adjacent clutch plate 20d by the effect of a hydraulic pressure generated at the time of a coupling command, allowing the clutch 20 to assume a clutch coupling condition and, accordingly, the rotation of the input side rotary shaft 20a is transmitted to the output side rotary shaft 20b. On the other hand, when the hydraulic pressure is released at the time of a decoupling command, each of the friction plates 20c is separated from the adjacent clutch plate 20d to allow the clutch 20 to assume a clutch decoupling condition and, hence, the rotation of the input side rotary shaft 20a is no longer transmitted to the output side rotary shaft 20b.

The input side rotary shaft 20a of the mechanical clutch 20 is drivingly connected with the input shaft 27 of the accessory gearbox 19, and an intermediate gear 28 is provided on the output side rotary shaft 20b of the mechanical clutch 20 and the intermediate gear 28 is meshed with a drive gear 14 of the power generation unit 1A. In this way, the input shaft 27 of the accessory gearbox 19 and the drive gear 14 of the power generation unit 1A are connected with each other through the mechanical clutch 20 having a selective coupling and decoupling capability. Also, the clutch housing 20e fixed to the input side rotary shaft 20a has a transmission gear (spur gear) 21 provided thereon and an auxiliary equipment drive gear (spur gear) 22 meshed with the transmission gear 21 is provided on a rotary shaft 29 of an auxiliary equipments 23 and 24 other than the power generation unit 1A.

Figure 2:
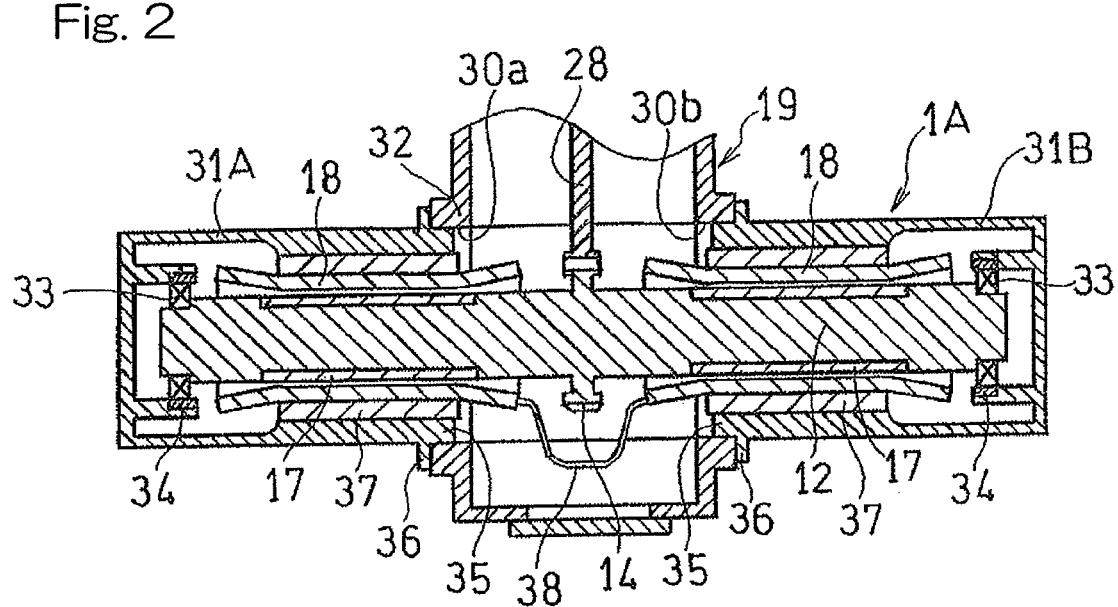
FIG. 2 is a longitudinal sectional view showing the power generation unit shown in FIG. 1.

As shown in FIG. 2, a housing 32 of the accessory gearbox 19 is provided with two insertion holes 30a and 30b defined therein so as to axially oppose to each other. One pair of power generator housings 31a and 31b are fitted to respective peripheral edge portion of the insertion holes 30a and 30b in the housing 32 so as to close those insertion holes 30a and 30b. In this condition, respective mounting portions 35 and 35 at open end portions of the power generator housings 31A and 31B are fitted in the insertion holes 30a and 30b and collar portions 36 and 36 are then fixed to the AGB housing 32 by means of screws (not shown). Thus, the power generation unit 1A is integrated with the accessory gearbox 19 with the power generator housings 31A and 31B being fitted to the AGB housing 32.

The rotor 12 in the form of a single rod-like member extends through the AGB housing 32 through the two insertion holes 30a and 30b, and is supported by the power generator housings 31A and 31B through bearings 33, which are provided at opposite lengthwise end portions, and squeeze film dampers 34 provided at associated outer peripheries thereof while the drive gear 14, which is integrally formed with the intermediate portion of the rotor 12, is meshed with the intermediate gear 28. The permanent magnet elements 17 necessitated to secure a desired power generating capacity are disposed on the opposite side portions of the intermediate portion of the rotor 12 with the drive gear 14 intervening therebetween. The stator coils 18 are fitted through yokes 37 to the respective power generator housings 31A and 31B so as to confront the outer peripheries of the permanent magnet elements 17. The stator coils 18 and 18 are electrically connected with each other by means of a connection line 38.

Figure 3A:
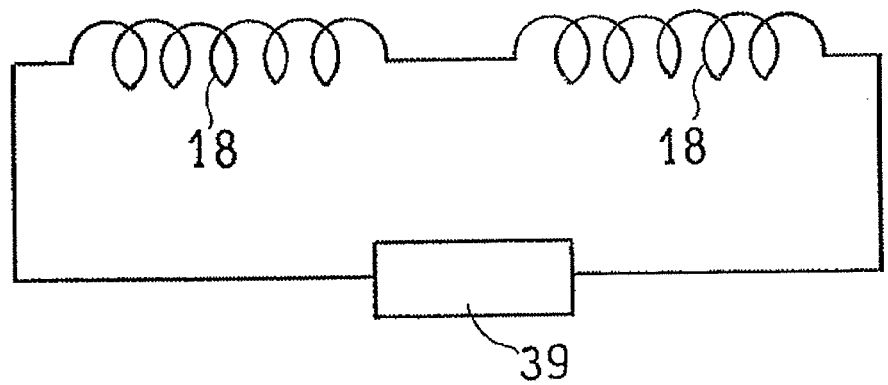
FIG. 3A is a circuit diagram showing a connection configuration between stator coils in the power generation unit.
Figure 3B:
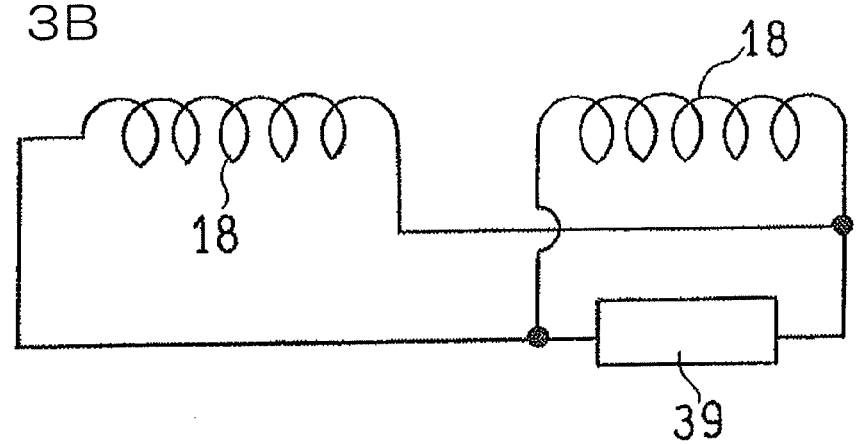
FIG. 3B is a diagram similar to FIG. 3A, showing a different connection configuration between the stator coils in the power generation unit.

The stator coils 18 and 18 are connected in series with each other as shown in FIG. 3A such that an electric power output, which is equal to the sum of respective electric powers generated, can be supplied to an electric load 39. Accordingly, where respective coil turns of those stator coils 18 and 18 are equal to each other and, hence, to generate an equal electric power, the output voltage is twice the output voltage available from one stator coil 18. It is to be noted that the stator coils 18 and 18 may not necessarily be connected in series with each other, but may be connected in parallel to each other as shown in FIG. 3B, in which case the output current, which is twice the output current available from one stator coil 18, is available.

Figure 4:
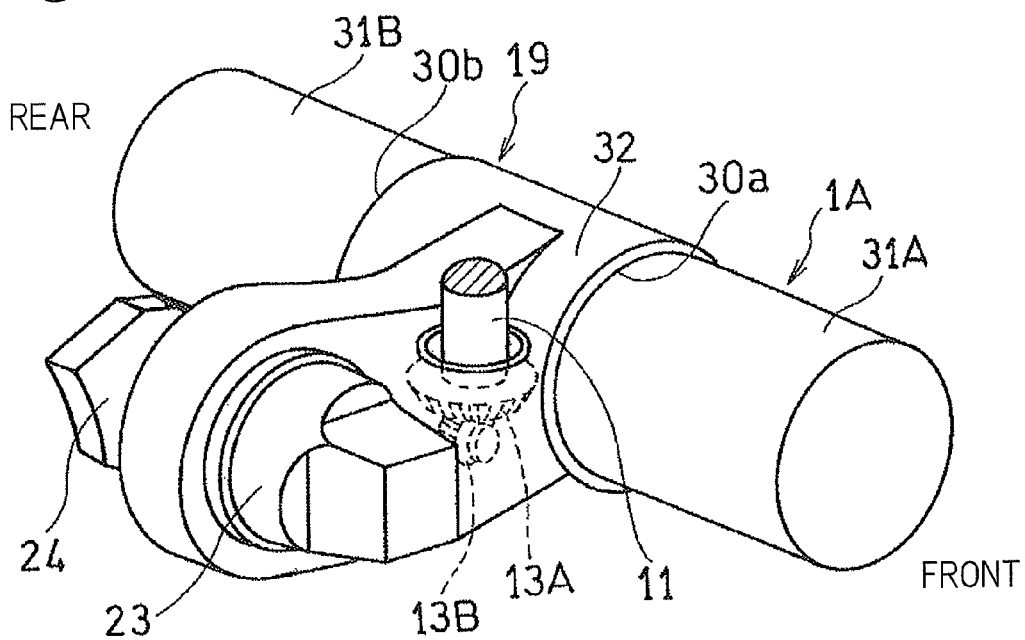
FIG. 4 is a perspective view showing the power generation unit shown in FIG. 1.

As shown in FIG. 4, the housings 31A and 31B of the power generation unit 1A are of a cylindrical shape elongated in a direction transverse to the AGB housing 32. On one side of the output shaft 11 in the AGB housing 32 opposite to the power generation unit 1A, other auxiliary equipments 23 and 24 such as, for example, a hydraulic pump, a lubricant pump, a fuel pump and others are provided, all having respective axes extending parallel to the power generation unit 1A.

As described above, the power generation unit 1A has an elongated contour as best shown in FIG. 1A and the reason for the selection of the elongated contour will now be discussed. The power generation unit 1A according to the present invention is of a permanent magnet type power generator configuration including the rotor 12 having the permanent magnet elements 17, mounted thereon, and the stator coils 18 disposed so as to confront the outer peripheries of the permanent magnet elements 17. Accordingly, in an attempt to increase the power generating capacity in concomitant with the demands for the large power generating capacity in recent years, the increase to the desired power generating capacity can be achieved by the increase of the axial size of each of the permanent magnet elements 17 and the stator coils 18, in contrast to the coil exciting type electric power generator employed in the conventional power generation unit, in which increase of the outer diameter is unavoidable due to the need to increase the coil turns for both of the rotor and the stator.

Also, since the stator coils 18 and 18, which are two components separated from each other, are electrically connected with each other, the sum of the respective electric powers generated becomes an output electric power. Accordingly, while securing the desired large power generating capacity, the rotor 12 and the stator coils 18 can be so designed and so configured as to have an elongated shape with a reduced outer diameter.

Figure 5:
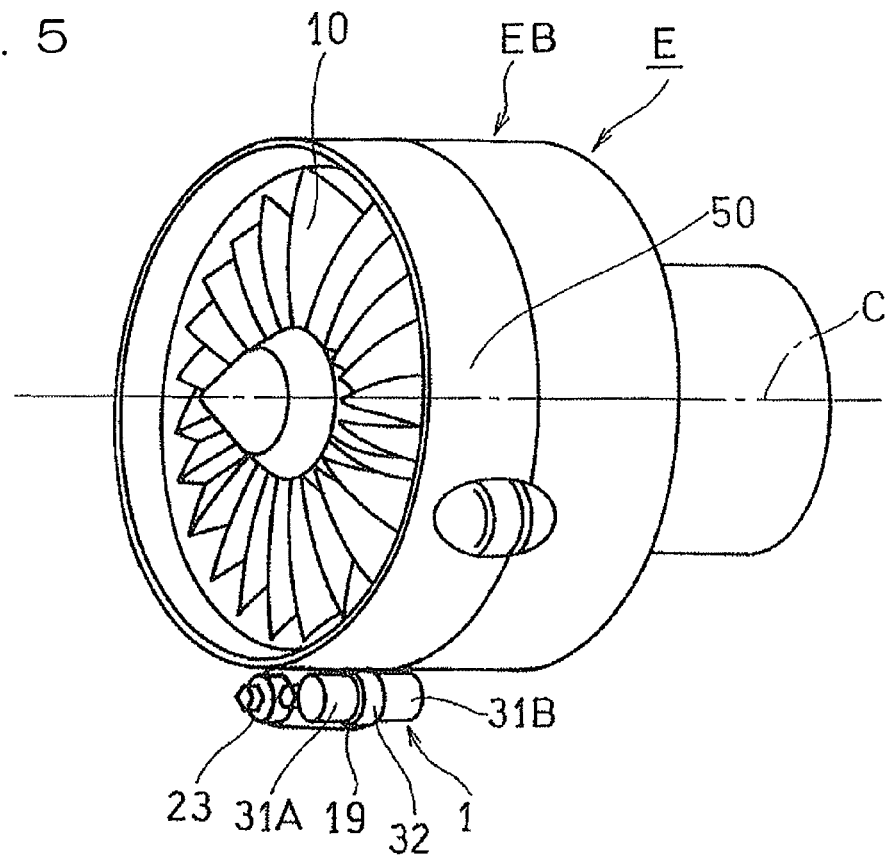
FIG. 5 is a perspective view showing the manner of mounting the power generation unit to the aircraft engine.
Figure 6:
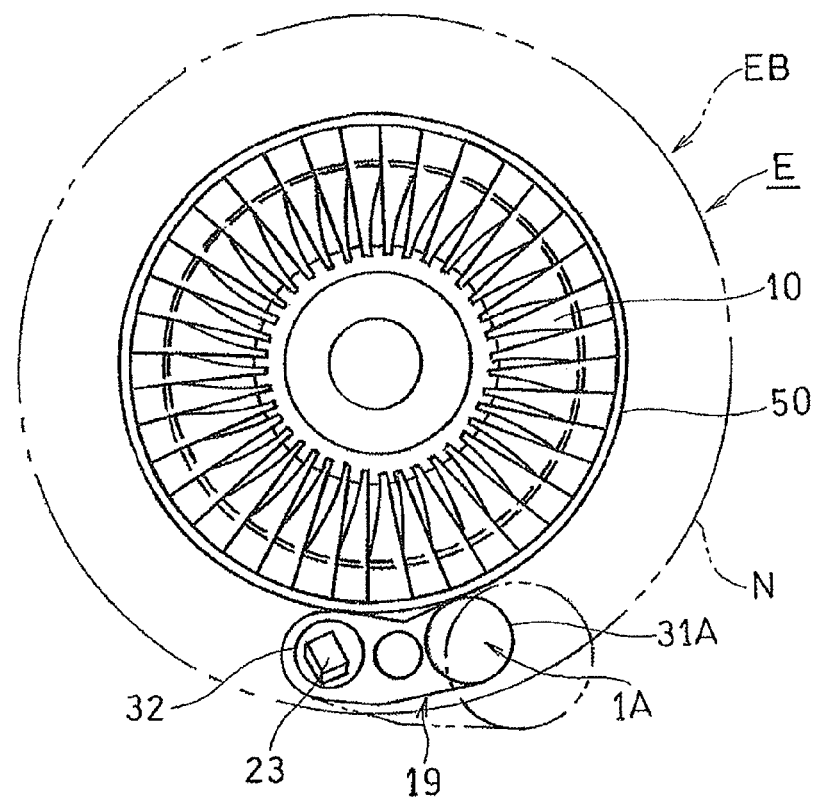
FIG. 6 is a schematic front elevational view showing the manner of connecting the power generation unit to the aircraft engine.

FIG. 5 illustrates a perspective view showing the manner of mounting the power generation unit 1A to the aircraft engine E. The power generation unit 1A is mounted to a lateral portion of a fan casing 50 with its lengthwise direction of the elongated contour oriented parallel to the engine axis C, that is, in a fashion in which the elongated contour of the power generation unit 1A oriented in the anteroposterior direction of the aircraft engine E. Accordingly, the elongated power generation unit 1A has a reduced dimension protruding laterally outwardly from the engine main body EB as shown in FIG. 6, which shows the front elevational view of the power generation unit 1A mounted to the engine E, and, hence, it does not increase the frontal projected area of the aircraft engine E. Accordingly, not only can it be possible to increase the mileage while the increase of the air resistance of the aircraft engine E is suppressed, but the stealth performance can also be increased. Also, where the power generation unit 1A is fitted to that lateral surface portion of the engine main body EB, the flow of air from the fan 10 is not disturbed. It is to be noted that the engine E, the accessory gearbox 19 and the power generation unit 1A are all enclosed in an engine nacelle N.

In the meantime, considering that the power generation unit 1A tends to have an elongated shape in order to secure the large power generating capacity, if such power generation unit 1A is mounted to one side surface of the accessory gearbox 19, that is, a front surface or a rear surface thereof, with the use of a support structure similar to the conventionally employed support structure, not only may the overhang moment beyond the accessory gearbox 19 be increased, but also vibrations tend to become considerable. Accordingly, the power generation unit 1A is so designed and so configured as to permit the elongated rotor 12, shown in FIG. 2, to extend through the AGB housing 32 while the drive gear 14 mounted on the intermediate portion of the rotor 12 is used to drive the rotor 12. Accordingly, since the rotor 12 is in position to protrude laterally outwardly from opposite side surfaces of the AGB housing 32, the increase of the overhang moment is advantageously suppressed and, also, it can be stably supported even though the power generation unit 1A assumes such a shape as to be long in order to secure the large power generating capacity.

Since in the power generation unit 1, the stator coils 18 and 18 on the opposite sides thereof are connected in series with each other as shown in FIG. 3A, the summed value of the respective output voltages of those stator coils 18 and 18 can be taken out as an output voltage. Where the stator coils 18 and 18 are connected in parallel to each other as shown in FIG. 3B, the summed value of the respective electric currents of the stator coils 18 and 18 can be taken out as an output current. Accordingly, in either case, the large electric power can be obtained which is equal to the sum of the respective electric powers of those stator coils 18 and 18. Consequently, in increasing the coil turns of each of the stator coils 18 and 18 in order to secure the desired large power generating capacity, it is sufficient to apply to each of the stator coils 18 and 18 the coil turns equal to half the coil turns required in the respective stator coil 18. For this reason, even where the large power generating capacity is to be secured, the diameter of each of the stator coil 18 does not increase.

Also, the power generation unit 1A, which is of a permanent magnet type structure, is difficult to have a system for interrupting the output electric power immediately in response to the halt of supply of an exciting current such as applicable with the coil exciting type electric power generator equipped in the existing power generation unit in the event of occurrence of an abnormality such as, for example, in the event of the shortcircuiting of the output line as a result of the occurrence of an electric leakage. In view of the above, as shown in FIG. 1, the mechanical clutch 20 is interposed between the input shaft 27 of the accessory gearbox 19 and the drive gear 14 of the rotor 12 to connect them. Accordingly, in the event of the occurrence of an abnormality, with the mechanical clutch 20 held in the decoupling condition, the power transmission from the high pressure shaft 7 to the rotor 12 of the power generation unit 1A can be immediately interrupted to stop the drive of the power generation unit 1A.

When the power generation unit 1A is stopped in the manner described above, the input shaft 27 of the accessory gearbox 19, that is, the input side rotary shaft 20a of the mechanical clutch 20 is held in a condition connected with the high pressure shaft 7 through the output shaft 11, and, therefore, it is possible for the power to be continuously transmitted to the auxiliary equipments 23 and 24 other than the power generation unit 1A via the transmission gear 21 and the auxiliary equipment drive gear 22. Also, as regards the electric leakage and the shortcircuiting of the output line, the frequency of occurrence thereof is extremely low and, when it is resolved, the power generation unit 1A can be easily re-driven by switching the mechanical clutch 20 to the coupling condition even during the flight of the aircraft.

Also, with this power generation unit 1A, if the rotor 12 comes to have an elongated shape with a small diameter in order to secure the large power generating capacity, it may be thought that the natural frequency of the rotor 12 becomes so low as to cause the rotational speed to decrease beyond the rotational speed of the high pressure shaft 7, and, in such case, considerable vibrations are apt to occur in the rotor 12 as a result of the resonance during the operation thereof. In order to avoid such vibrations of the rotor 12, the power generation unit 1A herein disclosed is such that tubular bearing supports for supporting the respective bearings 33 for the rotor 12 are provided as shown in FIG. 2, which bearing supports are in turn supported by the power generator housings 31A and 31B through the associated squeeze film dampers 34.

Each of the squeeze film dampers 34 is of a type in which a lubricant oil is supplied to an outer periphery of the bearing support to form a thin film layer of the lubricant oil between the corresponding power generator housing 31A or 31B and the bearing support, whereby the bearing support is permitted to displace in a radial direction a distance determined by the thickness of such film layer. When the vibration occurs in the rotor 12, the vibration, which is then transmitted to the bearing support through the associated bearing 33 for the rotor 12, is reduced by the utilization of the damping effect afforded by the layer of the lubricant oil. With the bearings 33 for the rotor 12 having been supported by the respective squeeze film dampers 34, the vibration occurring in the rotor 12 can be suppressed even though the rotor 12 is of the elongated shape.

Also, since the rotor 12 is in the form of the single rod-like member and is of a simplified structure in which the permanent magnet elements 17 are mounted on the opposite side portions of the drive gear 14 with respect to the intermediate portion intervening therebetween, the rotor 12 can be manufactured inexpensively.

Furthermore, the power generation unit 1A is of a structure in which the power generator housings 31A and 31B for enclosing the rotor 12 and the stator coils 18 are fitted from opposite sides into the AGB housing 32 to fix them to the AGB housing 32. Accordingly, the assemblage can be performed in such a manner that, after one of the power generator housings, for example, the power generator housing 31A, which is on left side in FIG. 2, has been fitted to the AGB housing 32, the rotor 12 is inserted from the right side into the power generator housing 31A to be supported by the power generator housing 31A, while the drive gear 14 of the rotor 12 is meshed with the intermediate gear 28, and, finally, the other power generator housing 31B is fitted to the AGB housing 32. Alternatively, the assemblage can be performed in such a manner that after the rotor 12 has been inserted through the AGB housing 32 to bring the drive gear 14 into engagement with the intermediate gear 28, the left and right power generator housings 31A and 31B are fitted to the AGB housing 32.

In the power generation unit 1A, since the drive gear 14 shown in FIG. 1 is drivingly connected with the high pressure shaft 7, which forms a part of the engine rotary shaft, via the intermediate gear 28 and the train of the bevel gears 13A, 13B, 8A and 8B, the engine E can be started by rotatively driving the high pressure shaft 7 and the high pressure turbine 4A. Accordingly, the power generation unit 1A may operate also as an engine starter. Hence, the existing starter is no longer necessary and the structure can be simplified.

Figure 7:
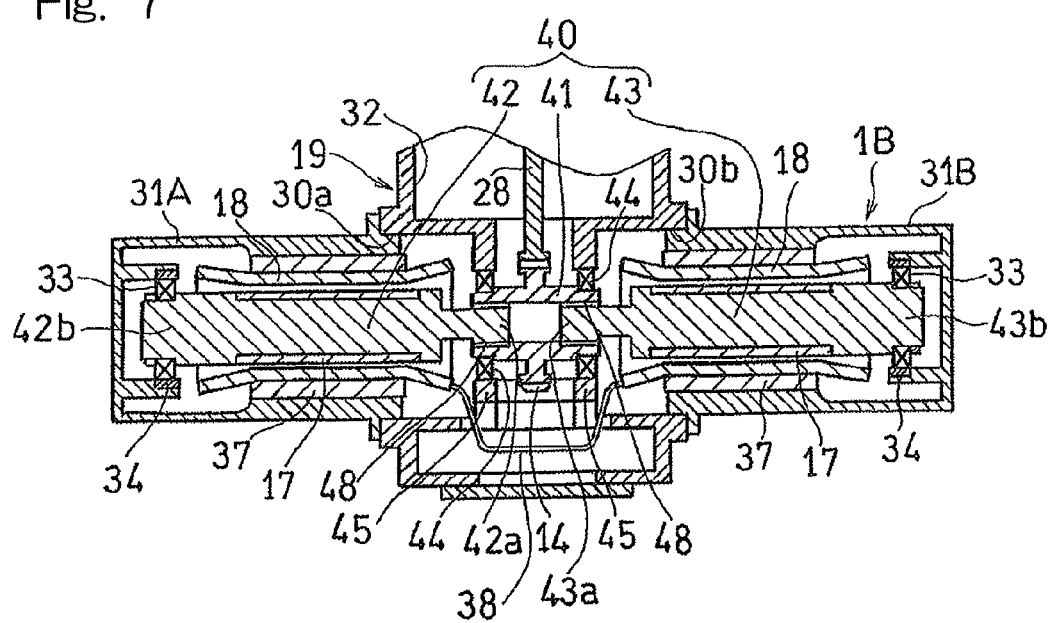
FIG. 7 is a longitudinal sectional view showing the power generation unit for the aircraft engine in accordance with the second embodiment of the present invention.

Reference is now made to FIG. 7 which illustrates a fragmentary longitudinal sectional view of the power generation unit 1B for the aircraft engine E in accordance with the second embodiment of the present invention, noting that the component parts shown therein, but similar to those shown in and described in connection with the previous embodiment of the present invention are designated by like reference numerals and, therefore, the details thereof are not reiterated for the sake of brevity. The power generation unit 1B according to the second embodiment makes use of a rotor 40 of a structure that is configured to be divided in the left-to-right direction in FIG. 7 (axial direction) into three components, that is, three rotor pieces 41, 42 and 43. An intermediate rotor piece 41, which forms an intermediate portion of the rotor 40, is in the form of a geared shaft member having the drive gear 14 formed integrally with an axially intermediate portion of an outer peripheral surface with spline being formed in an inner periphery. The left and right rotor pieces 42 and 43 have respective inner end portions connected be means of spline coupling 48 to the intermediate rotor piece 41 from opposite sides to thereby complete the rod-like rotor 40 having an intermediate portion provided with the drive gear 14.

The intermediate rotor piece 41 is rotatably supported by a support portion 45, provided within the AGB housing 32, through a pair of bearings 44. Within the hollow of the intermediate rotor piece 41, connecting heads 42a and 43a of the left and right rotor pieces 42 and 43 are connected be means of the spline coupling 48 so that they does not undergo a relative rotation. Outer end portions 42b and 43b of the left and right rotor pieces 42 and 43 are supported by the corresponding power generator housings 31A and 31B through the bearings 33 and the squeeze film dampers 34.

Even in this power generation unit 1B, effects similar to those afforded by the previously described first embodiment can be obtained. In addition, the assemblage can be performed in such a manner that the intermediate rotor piece 41 is caused to be rotatably supported by the support portion 45 of the accessory gearbox 19 through the bearings 44 and, while the left rotor piece 42 has been assembled to one of the power generator housings, for example, the left power generator housing 31A and the right rotor piece 43 has similarly been assembled to the right power generator housing 31B, the left and right rotor pieces 42 and 43 are connected with the intermediate rotor piece 41 from opposite sides by means of the respective spline coupling 48, followed by fitting of the left and right power generator housings 31A and 31B to the AGB housing 32. Since the left and right rotor pieces 42 and 43 can be assembled to the left and right power generator housings 31A and 31B beforehand, the assemblage of the power generation unit 1B can be accomplished easily.

The present invention is not necessarily limited to the embodiments shown in and described with reference to the accompanying drawings, noting that various additions, modifications and deletions are possible without departing from the spirit of the present invention and, accordingly, such additions, modifications and deletions are to be understood as included within the scope of the present invention.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1A, 1B . . . Power generation unit
7 . . . High pressure shaft (Engine rotary shaft)
11 . . . Output shaft
12 . . . Rotor
14 . . . Drive gear
17 . . . Permanent magnet element
18 . . . Stator coil
19 . . . Accessory gearbox
20 . . . Mechanical clutch
23, 24 . . . Other auxiliary equipments
27 . . . Input shaft
31A, 31B . . . Power generator housing
33 . . . Bearing
34 . . . Squeeze film damper
40 . . . Rotor
41 . . . Intermediate rotor piece (Intermediate portion of the rotor)
42, 43 . . . Left and right rotor piece (Opposite side portions of the rotor)
E . . . Aircraft engine
EB . . . Engine main body

What is claimed is:

1. A power generation unit for an aircraft engine, which unit is connected with an engine rotary shaft of the aircraft engine via an accessory gearbox, the power generation unit comprising:
    a rotor extending through the accessory gearbox and having an intermediate portion positioned longitudinally intermediate of the rotor, and opposite side portions with the intermediate portion intervening therebetween;
    a drive gear mounted on the intermediate portion of the rotor to drive the rotor;
    permanent magnet elements respectively mounted on outer peripheries of the opposite side portions of the rotor; and
    stator coils disposed separately from each other so as to respectively confront outer peripheries of the permanent magnet elements and the outer periphery of the rotor on which the permanent magnet elements are mounted, the stator coils being electrically connected with each other.

2. The power generation unit for the aircraft engine as claimed in claim 1, wherein the rotor is disposed parallel to the engine rotary shaft.

3. The power generation unit for the aircraft engine as claimed in claim 1, wherein the stator coils are electrically connected in series with each other.

4. The power generation unit for the aircraft engine as claimed in claim 1, further comprising a mechanical clutch configured to selectively couple and decouple between the drive gear and an input shaft of the accessory gearbox, the input shaft of the accessory gearbox being connected with the engine rotary shaft through an output shaft.

5. The power generation unit for the aircraft engine as claimed in claim 1, further comprising a squeeze film damper configured to support a bearing of the rotor with respect to a power generator housing.

6. The power generation unit for the aircraft engine as claimed in claim 1, wherein the rotor is in the form of a single rod-like member.

7. The power generation unit for the aircraft engine as claimed in claim 1, wherein the rotor is configured to be divided into the intermediate portion and the opposite side portions.

8. The power generation unit for the aircraft engine as claimed in claim 1, wherein the power generation unit is connected with a high pressure shaft that forms a part of the engine rotary shaft, and is configured to operate as an engine starter.

9. An accessory gearbox for an aircraft engine, comprising:
    an input shaft connected through an output shaft with an engine rotary shaft of the aircraft engine;
    the power generation unit as defined in claim 1; and
    a mechanical clutch configured to selectively couple and decouple between the input shaft and the drive gear.

* * * * *